US010151425B1

(12) United States Patent
Bileth

(10) Patent No.: US 10,151,425 B1
(45) Date of Patent: Dec. 11, 2018

(54) POST MOUNTABLE OBJECT HOLDER

(71) Applicant: Jeffrey A. Bileth, Caledonia, MI (US)

(72) Inventor: Jeffrey A. Bileth, Caledonia, MI (US)

( * ) Notice: Subject to any disclaimer, the term of this patent is extended or adjusted under 35 U.S.C. 154(b) by 211 days.

(21) Appl. No.: 15/055,790

(22) Filed: Feb. 29, 2016

(51) Int. Cl.
*A47B 96/00* (2006.01)
*F16M 13/02* (2006.01)
*F16B 2/06* (2006.01)
*F16B 2/12* (2006.01)
*B25H 3/06* (2006.01)

(52) U.S. Cl.
CPC ............. *F16M 13/022* (2013.01); *B25H 3/06* (2013.01); *F16B 2/065* (2013.01); *F16B 2/12* (2013.01)

(58) Field of Classification Search
CPC . A47B 96/1425; A47B 96/002; A47B 96/025; A47F 5/04; A47F 5/10
USPC ...... 211/107, 110, 111, 175, 90.02; 312/205; 248/218.4, 230.3, 231.41; 108/149, 151, 108/152, 102, 137
See application file for complete search history.

(56) References Cited

U.S. PATENT DOCUMENTS

| | | | |
|---|---|---|---|
| 105,327 A * | 7/1870 | Gorton | |
| 535,767 A * | 3/1895 | Murdock et al. | |
| 1,291,794 A * | 1/1919 | Droste | A47C 17/86 312/205 |
| 1,319,445 A * | 10/1919 | Wilson | A47C 3/26 108/141 |
| 1,350,367 A * | 8/1920 | Giddings | 211/107 |
| 1,693,298 A * | 11/1928 | Ingham | H01Q 1/1221 248/231.21 |
| 1,709,239 A * | 4/1929 | Ver Wiebe | B67D 7/84 211/107 |
| 2,261,454 A * | 11/1941 | Scheu | A01G 13/105 211/107 |
| 2,846,175 A * | 8/1958 | Sexton | A01G 23/08 144/34.1 |
| 2,864,510 A * | 12/1958 | Sture | A24F 9/14 108/151 |
| 2,867,401 A * | 1/1959 | Sheahan | A47C 7/68 108/47 |
| 2,958,760 A * | 11/1960 | McNally | F21L 14/00 24/523 |
| 3,449,002 A * | 6/1969 | Bernard | A47F 5/14 211/107 |
| 3,861,432 A * | 1/1975 | Rothenberger | B25H 1/04 108/151 |
| 5,024,067 A | 6/1991 | Maier, II | |

(Continued)

FOREIGN PATENT DOCUMENTS

FR 2392637 6/1977

*Primary Examiner* — Janet M Wilkens
(74) *Attorney, Agent, or Firm* — Gardner, Linn, Burkhart & Ondersma LLP

(57) ABSTRACT

A clamp fixture configured for affixing a tool tray to a post for supporting objects includes first and second clamp portions. Each clamp portion includes an engagement leg and a clamp leg. The engagement legs of the first and second clamp portions are configured to adjustably mate, such that the clamp legs of the first and second clamp portions engage surfaces of the post. The clamp legs of the first and second clamp portions are adjustably separable relative to each other via the engagement legs of the first and second clamp portions to affix the tool tray to the post. The first and second clamp portions each include overlapping flange portions and upright walls on the flange portions, to form tool tray halves.

19 Claims, 9 Drawing Sheets

(56) References Cited

U.S. PATENT DOCUMENTS

| | | | | |
|---|---|---|---|---|
| 5,114,023 | A | * | 5/1992 | Lavin .................... A47B 57/54 211/107 |
| 5,456,436 | A | | 10/1995 | Faudie |
| 5,490,607 | A | | 2/1996 | Hsieh et al. |
| 6,360,884 | B1 | | 3/2002 | Smith et al. |
| 6,889,618 | B1 | * | 5/2005 | Gromack ............. A47B 13/088 108/151 |
| 7,404,532 | B1 | * | 7/2008 | Baril ..................... E06L 39/04 248/218.4 |
| 7,594,706 | B2 | * | 9/2009 | Styka .................... A47B 88/40 312/205 |
| 7,802,680 | B2 | | 9/2010 | Krebs et al. |
| 8,226,057 | B2 | * | 7/2012 | Ao ...................... H01Q 1/1228 248/218.4 |
| 8,317,143 | B1 | * | 11/2012 | Abreu ................... A47G 7/044 211/107 |
| 8,967,562 | B1 | | 3/2015 | Bileth |
| 2001/0052505 | A1 | * | 12/2001 | Lee ..................... B65G 11/143 211/85.18 |
| 2004/0084593 | A1 | | 5/2004 | Barfield |
| 2005/0056655 | A1 | | 3/2005 | Gary |
| 2008/0169737 | A1 | * | 7/2008 | Shen .................... A47B 45/00 312/205 |
| 2008/0264883 | A1 | * | 10/2008 | Stafford ................. A47F 5/04 211/107 |
| 2011/0198466 | A1 | * | 8/2011 | Lloyd .................... B66B 31/00 248/229.12 |
| 2011/0303808 | A1 | | 12/2011 | Bileth |

* cited by examiner

POST MOUNTABLE OBJECT HOLDER

The present invention is directed to equipment fixtures, and more particularly to affixing tool trays with adjustable clamping fixtures to posts or columns. Conventional posts/columns do not include tool trays.

SUMMARY OF THE INVENTION

The present invention provides a clamp fixture and methods and systems configured for affixing tool trays to a post for supporting objects. The clamp fixture includes a plurality of clamp portions that adjustably clamp the post between them. The clamp fixture also includes a plurality of tool tray portions and flanges projecting from the plurality of tool tray portions. The clamp fixture provides for the tool tray to be clamped onto a variety of posts of varying cross-section shapes and dimensions.

According to an aspect of the present invention, a clamp fixture configured for affixing a tool tray to a post for supporting objects includes first and second clamp portions, with each clamp portion including an engagement leg and a clamp leg. The engagement legs of the first and second clamp portions adjustably mate, such that the clamp legs of the first and second clamp portions engage surfaces of the post. The clamp legs of the first and second clamp portions are adjustably separable relative to each other via the engagement legs of the first and second clamp portions to affix the tool tray to the post. The first and second clamp portions each include overlapping flange portions and upright walls on the flange portions, to form the tool tray.

According to an aspect of the present invention, a method for affixing a tool tray to a post for supporting objects includes arranging first and second clamp portions that each include an engagement leg and a clamp leg, such that the engagement legs of the first and second clamp portions adjustably mate to engage surfaces of the post with the clamp legs of the first and second clamp portions. The clamp legs of the first and second clamp portions are adjustably separable relative to each other via the engagement legs of the first and second clamp portions to affix the tool tray to the post. The first and second clamp portions each include overlapping flange portions and upright walls on the flange portions, to form the tool tray.

According to a further aspect of the present invention, the flange portions include openings for supporting and retaining hand tools and tool accessories.

According to a further aspect of the present invention, the upright walls are positioned such that the flange portions extend beyond the tool tray defined by the upright walls.

According to a further aspect of the present invention, each of the engagement legs includes a square tube, with a square tube of the first engagement leg sliding into a square tube of the second engagement leg to adjustably mate the first and second clamp portions.

According to a further aspect of the present invention, the engagement leg of the first clamp portion includes a retained nut threaded to receive a bolt that passes through an opening in the engagement leg of the second clamp portion, such that the first and second clamp portions are adjustably matted to engage surfaces of the post with the clamp legs of the first and second clamp portions.

According to a further aspect of the present invention, the clamp legs of the first and second clamp portions are angled such that distal portions of the clamp legs are closer together than proximal portions of the clamp legs.

According to a further aspect of the present invention, distal portions of the clamp legs of the first and second clamp portions include a grip surface that is a textured, non-slip surface for engaging with the post.

As discussed herein, the use of the first and second clamp portions allows a tool tray with extending flanges to be reliably mounted to a post for supporting objects. As also discussed herein, the first and second clamp portions are adjustable to accommodate posts of varying cross-sectional shapes and dimensions. Similarly, the tool tray, formed by overlapping flanges and upright walls, may be formed with a variety of dimensions, shapes, and openings for receiving and retaining tools and accessories for the tools.

These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
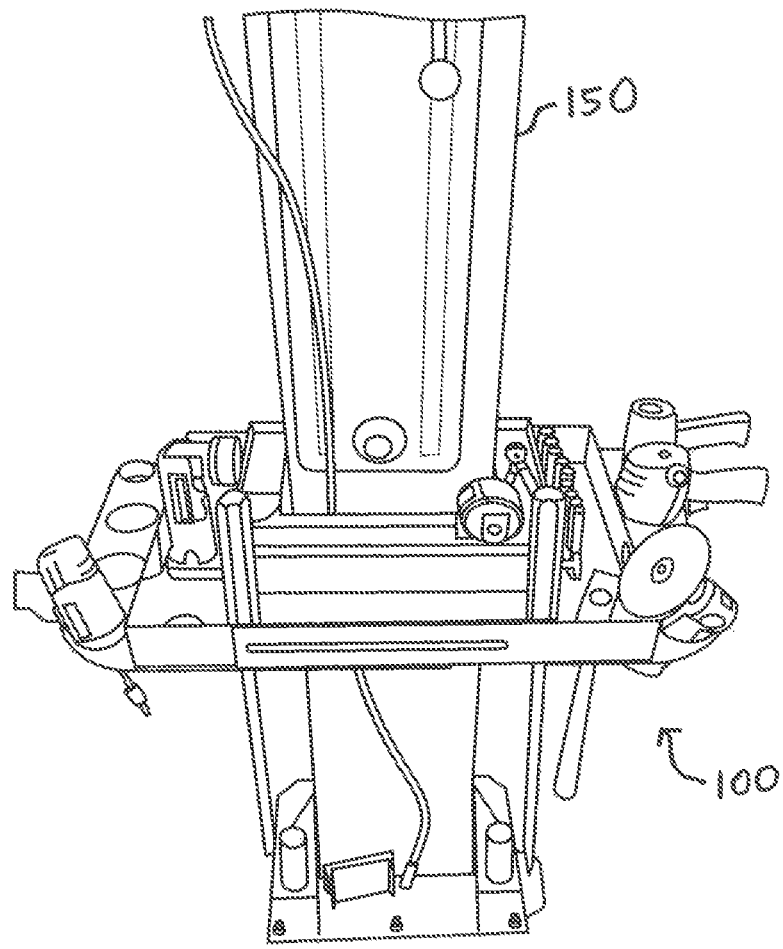
FIG. 1 is an exemplary three-dimensional forward view of a clamp fixture configured for affixing a tool tray to a post for supporting objects in accordance with an embodiment of the present disclosure.
Figure 2:
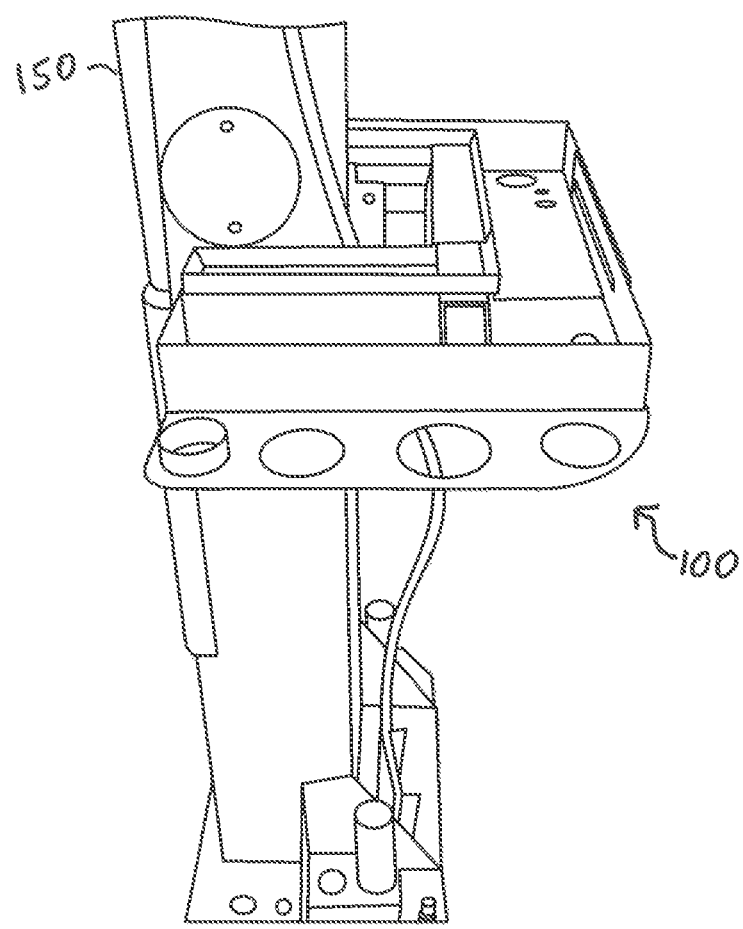
FIG. 2 is an exemplary three-dimensional left-side view of the clamp fixture illustrated in FIG. 1, in accordance with an embodiment of the present disclosure.
Figure 3:
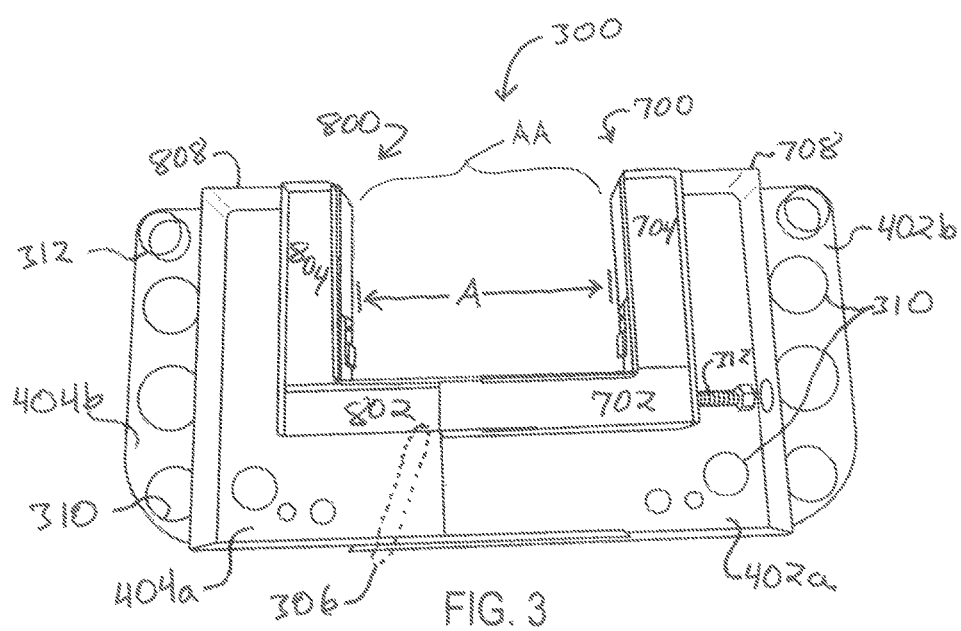
FIG. 3 is an exemplary three-dimensional top-down view of the clamp fixture illustrated in FIG. 1, in accordance with an embodiment of the present disclosure.

As illustrated in FIGS. 1-3, an exemplary tool tray and equipment holder 100 comprises a clamp fixture 300 with clamp portions 700, 800 (see FIGS. 7 & 8) for clamping around lift columns or posts 150 of an automobile lift or other similar device for lifting objects. The tool tray and equipment holder 100 may also be known as a tool tray 100. As discussed herein, each clamp portion 700, 800 of the clamp fixture 300 may be attached to half of a tray, such that when combined, the two tray halves form the tray portion 306 of the tool tray 100.

As illustrated in FIG. 1, a variety of hand tools and accessories and/or attachments for the hand tools may be stored and retained in the tool tray 100. As illustrated in FIG. 1, the hand tools may include a variety of power tools, such as drills, sanding tools, flash lights, and other similar tools; as well as hand tools such as screw drivers, hammers, socket sets, tape measures, and other similar tools. While FIG. 1 illustrates a range of hand tools and accessories that may be placed into and retained by the tool tray 100, any variety of hand tools and related accessories or attachments may be retained.

As discussed herein, and illustrated in FIGS. 1-4, hand tools and related accessories/attachments may be retained in holes 310 provided in flanges 402, 404 (see FIG. 4) that make up the floor 402a, 404a of a tray portion 306 of the tool tray 100, as well as in portions 402b, 404b of the flanges 402, 404 that extend beyond the tray portion 306 (see FIG. 3). As also illustrated in FIGS. 1-3, the holes 310 in the flanges 402, 404 may be of a variety of sizes and in a variety of locations. Other holes 310 of varying sizes may be placed in different locations of the flanges 402, 404.

Figure 5:
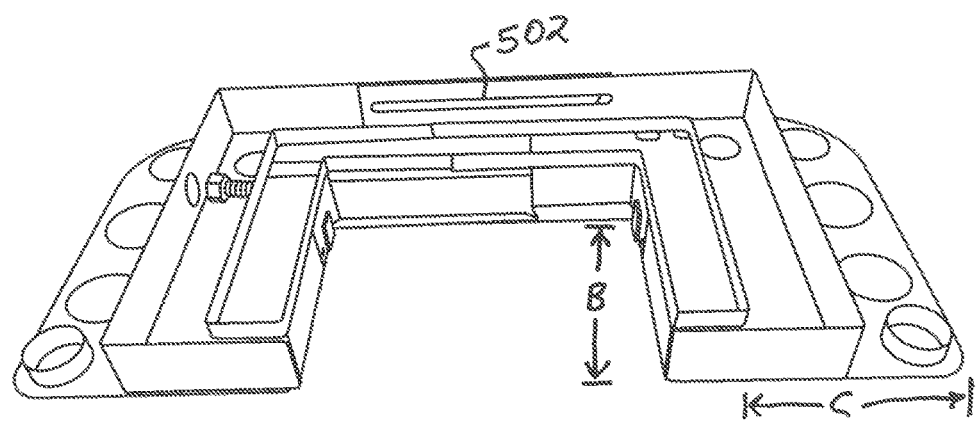
FIG. 5 is an exemplary three-dimensional back-side view of the clamp fixture illustrated in FIG. 1, in accordance with an embodiment of the present disclosure.
Figure 6:
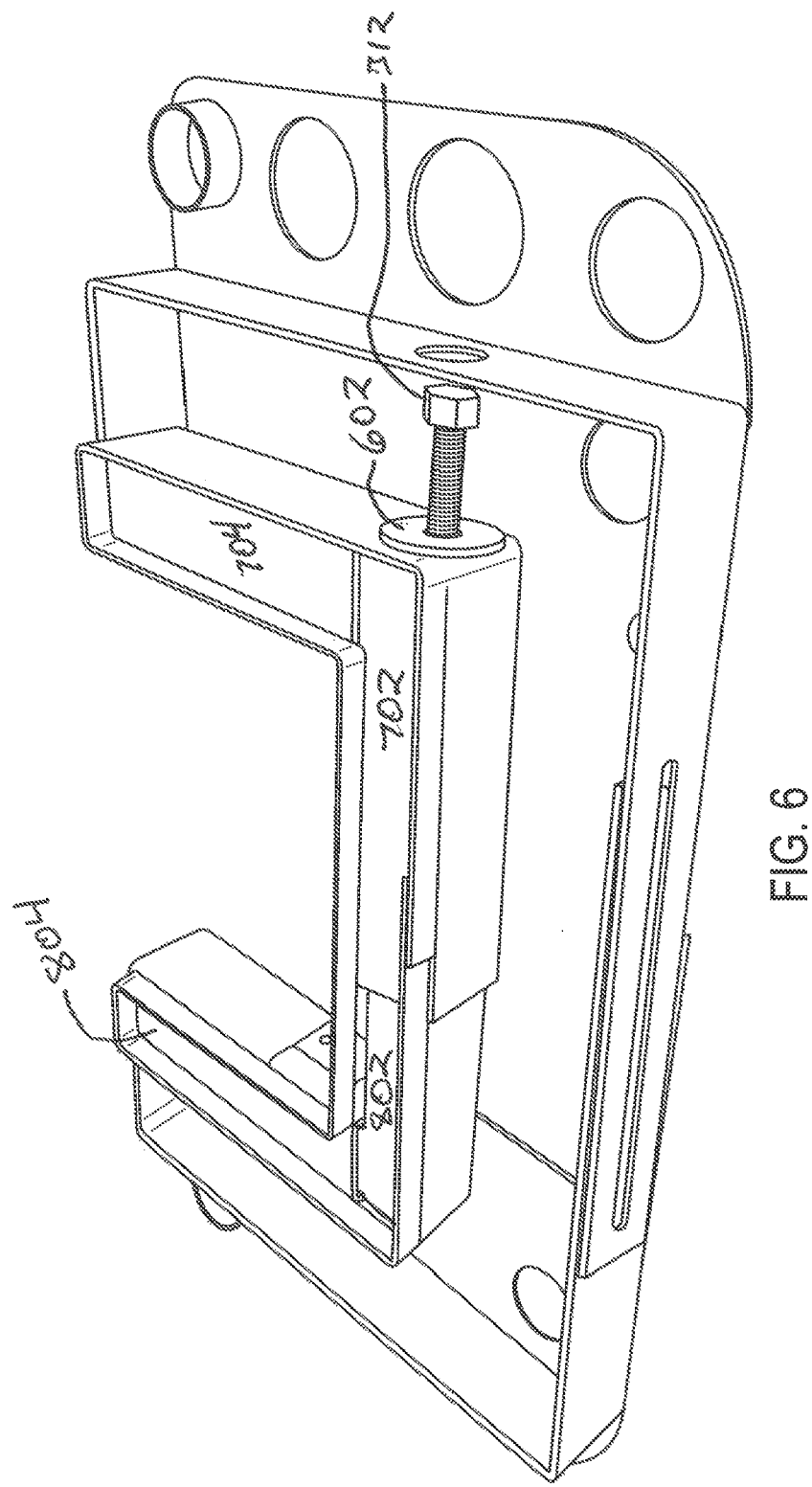
FIG. 6 is an exemplary three-dimensional right-side view of the clamp fixture illustrated in FIG. 1, in accordance with an embodiment of the present disclosure.
Figure 7:
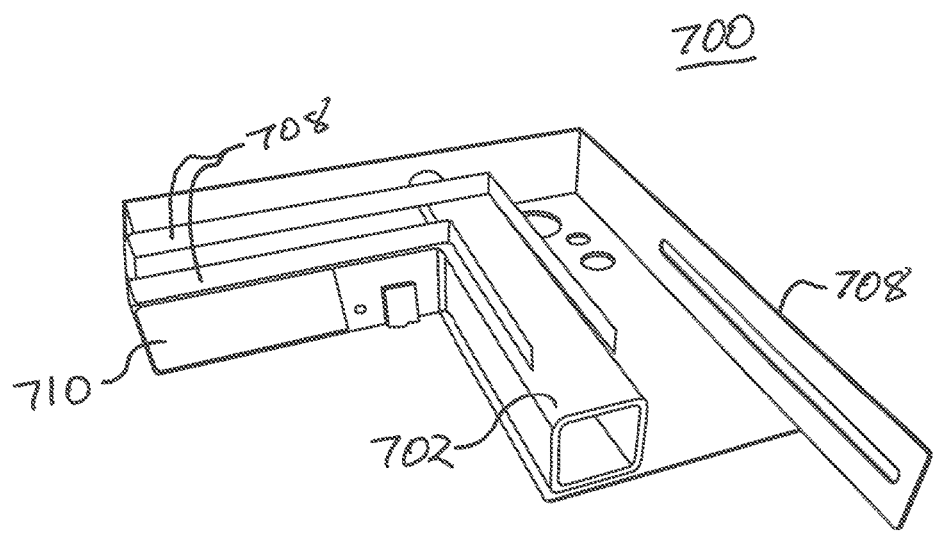
FIG. 7 is an exemplary three-dimensional side view of a second clamp portion of the clamp fixture illustrated in FIG. 1, in accordance with an embodiment of the present disclosure.
Figure 8:
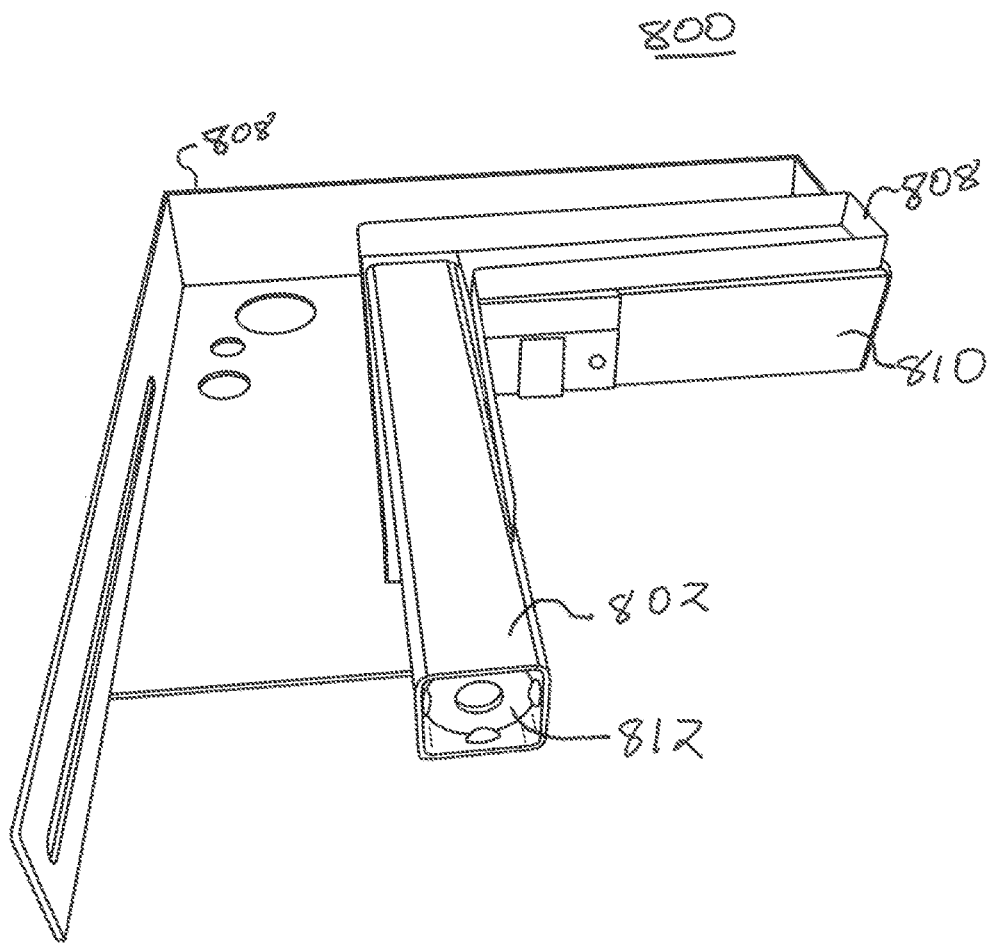
FIG. 8 is an exemplary three-dimensional side view of a first clamp portion of the clamp fixture illustrated in FIG. 1, in accordance with an embodiment of the present disclosure.

As illustrated in FIGS. 3-8, and discussed herein, an exemplary tool tray 100 comprises a clamping fixture 300 with a pair of adjustable clamp portions 700, 800 (see FIGS. 7 & 8) that slide one into the other. As also illustrated in FIGS. 3, 7, and 8, and discussed herein, the first and second clamp portions 700, 800 comprise respective engagement legs 702, 802, and clamp legs 704, 804, with the engagement legs 702, 802 being connected to respective clamp legs 704, 804 in L-shaped orientations (see FIG. 3). Each adjustable clamp portion's tray half is formed from a flange portion 402, 404 and upright wall portions 708, 808 that when overlapped with corresponding flange portions 402, 404 and upright wall portions 708, 808 of the other adjustable clamp portion's tray half forms an adjustable tray 306 (see FIG. 3). In one embodiment, an adjustable unbounded gap A (see FIG. 3) between the clamp legs 704, 804 may be an exemplary 8-16 inches that thus defines an opening AA between the clamp legs 704, 804. Similarly, an interior length B (see FIG. 5) of a clamp leg 704, 804 may be an exemplary 10 inches. A flange 402, 404 may also extend away from a respective clamp leg 704, 804 an exemplary 10 inches (see length C in FIG. 5).

As illustrated in FIGS. 3-6, the flange portions 402, 404 and upright wall portions 708, 808 form a tray 306 that wraps around outer perimeters of the second (right-hand) clamp portion 700 and the first (left-hand) clamp portion 800. In other words, each clamp portion 700, 800 with a separate flange portion 402, 404 and upright wall portion 708, 808 comprises half of the adjustable tray 306. As discussed herein, when the two clamp portions 700, 800 of the clamping fixture 300 are arranged around a post 150, their corresponding, overlapping flange portions 402, 404 and upright wall portions 708, 808 form the adjustable tray 306 of the tool tray 100. The upright wall portions 708, 808 may also provide rigidity and stiffening while creating the adjustable tray 306.

Figure 4:
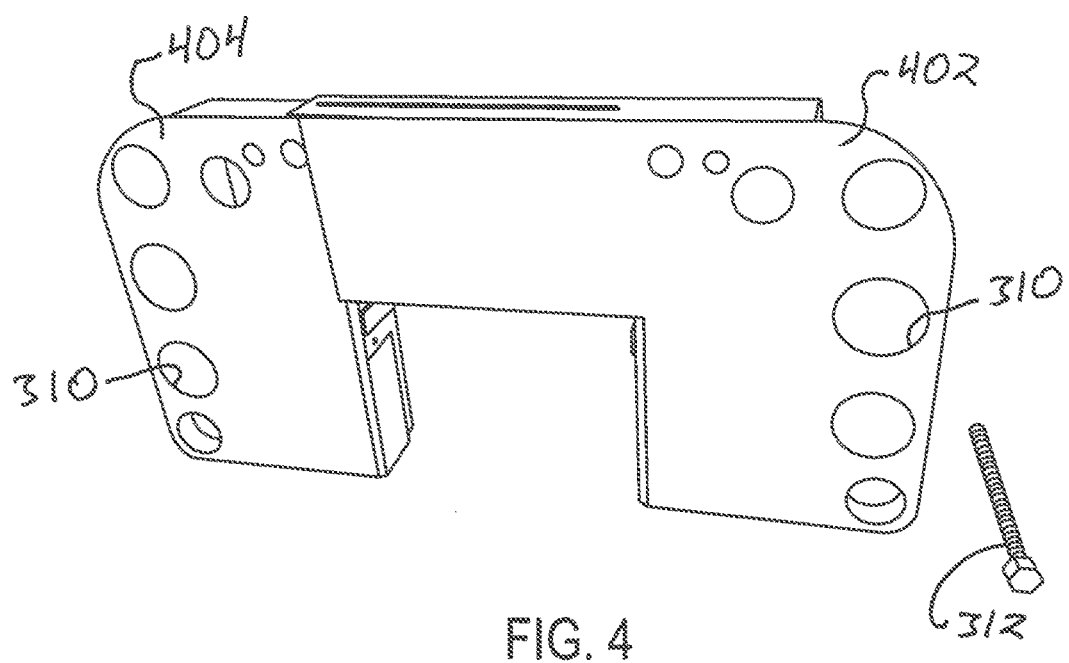
FIG. 4 is an exemplary three-dimensional bottom-side view of the clamp fixture illustrated in FIG. 1, in accordance with an embodiment of the present disclosure.

As illustrated in FIGS. 3-6, the upright wall portions 708, 808 define the adjustable tray 306, with the flange portions 402, 404 divided into portions 402a, 404a that are bound by the upright wall portions 708, 808, and portions 402b, 404b that are outside the upright wall portions 708, 808. As also illustrated in FIGS. 3 and 4, holes 310 are provided in the flange portions 402, 404 that may be found in either portion 402a/b, 404a/b of the flanges. In one embodiment, one or more of the holes 310 may have sidewalls 312 for retaining hand tools (See FIG. 3).

In one exemplary embodiment, illustrated in FIG. 5, each upright wall portion 708, 808 may include slots 502 that overlap. The overlapping slots 502 may be used to provide additional securing of the upright wall portions 708, 808 together. In one embodiment, the overlapping slots 502 may be secured with a bolt, washer, and wingnut, or other suitable securing methods. In other embodiments, the overlapping slots 502 may be replaced with one or more pairs of holes that may be lined up and secured with nuts and bolts.

FIG. 6 illustrates a right-side view of the clamp fixture 300. As illustrated in FIG. 6, the retaining bolt 312 enters the engagement leg 702 through an opening 602. When the retaining bolt 312 is tightened down against the reinforced opening 602 in the engagement leg 702, the two clamp portions 700, 800, as discussed herein, will make contact with opposite sides of a post 150 (see FIG. 1) sufficient to hold the tool tray 100 in position.

FIG. 7 illustrates a second clamp portion 700 (also known as a right clamp portion), while FIG. 8 illustrates a first clamp portion 800 (also known as a left clamp portion). As illustrated in FIGS. 3, 7, and 8, outer perimeters of the first and second clamp portions 700, 800 are bounded by flange portions 402, 404 and upright wall portions 708, 808. As also illustrated in FIGS. 4, 7, and 8, the engagement legs 702, 802 and clamp legs 704, 804 are sitting on the flange portions 402, 404. In other words, each clamp portion 700, 800 sits on a respective flange portion 402, 404.

As also illustrated in FIGS. 7 and 8, the clamp legs 704, 804 also include engagement pads 710, 810. The engagement pads 710, 810 may be made of non-slip, textured materials. As discussed herein, the engagement pads 710, 810 are configured to make contact with opposite sides of a post 150, to retain a tool tray 100 on the post 150.

As illustrated in FIGS. 7 and 8, each of the engagement legs 702, 802 may comprise a square-shaped tube. As illustrated in FIGS. 3 and 6-8, and discussed herein, the square-shaped tube of the engagement leg 702 comprises an opening 602 so that a bolt 312 may be inserted and threaded into a nut 812 welded into the square-shaped tube of the engagement leg 802. As illustrated in FIGS. 1, 3, 7, and 8, when the first and second clamp portions 700, 800 are arranged around a post or lift column 150, the retaining bolt 312 may be inserted into the through-hole 602 of the engagement leg 702 (of the second clamp portion 700) and threaded into the nut 812 welded into the engagement leg 802 (of the first clamp portion 800). As also illustrated in FIG. 3, an opening in the upright wall portion 708 of the second clamp portion 700 allows for a nut driver to be inserted to tighten the bolt 312 into the nut 812 welded into the engagement leg 802.

In one embodiment, the retaining bolt 312 may comprises "Acme" threads. In another embodiment the retaining bolt 312 may be a ⅝" bolt. In another embodiment, the square-shaped tube of the engagement leg 702 (of the right clamp portion 700) is an exemplary 2½ inches in cross-section, while the square-shaped tube of the engagement leg 802 (of the left clamp portion 800) is an exemplary 2 inches in cross-section, allowing the engagement leg 702 of the second clamp portion 700 to easily slide into the engagement leg 802 of the first clamp portion 800.

Figure 9:
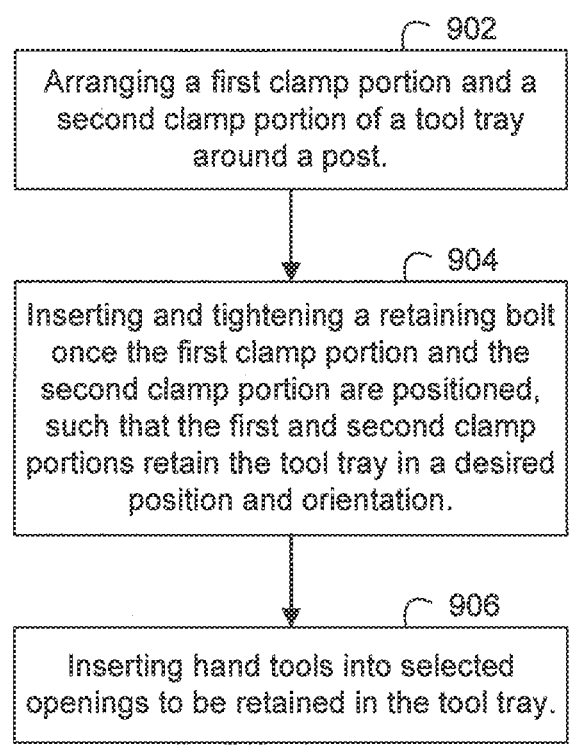
FIG. 9 is an exemplary flow diagram of steps to a method for affixing a tool tray to a post for supporting objects.

FIG. 9 illustrates the steps to a method for affixing a tool tray 100 to a post 150 for supporting objects. In step 802 of FIG. 8, a first clamp portion 800 and a second clamp portion 700 of a tool tray 100 are arranged around a post 150 at a desired height. Each clamp portion 700, 800 comprises an engagement leg 702, 802, and a clamp leg 704, 804. The first and second clamp portions 700, 800 are arranged around the post 150 such that the engagement legs 702, 802 of the first and second clamp portions 700, 800 adjustably mate to engage the clamp legs 704, 804 of the first and second clamp portions 700, 800 with surfaces of the post 150. As discussed herein, the clamp legs 704, 804 of the first and second clamp portions 700, 800 are adjustably separable relative to each other via the engagement legs 702, 802 of the first and second clamp portions 700, 800 to affix the tool tray 100 to the post 150. The first and second clamp portions 700, 800 each include overlapping flange portions 402, 404 and upright wall portions 708, 808 on the flange portions 402, 404, to form a tray portion 306 of the tool tray 100.

In step 904 of FIG. 9, once the first clamp portion 800 and the second clamp portion 700 have been positioned around the post, and at a desired height, a bolt 312 is inserted. The bolt 312 is inserted through an opening 602 in the engagement leg 702 of the second clamp portion 700 and into a threaded nut 812 welded into the engagement leg 802 of the first clamp portion 800. With the bolt 312 threaded into the welded nut 812, the bolt 312 may be tightened down to a desired friction against the opening 602, such that the tool tray 100 is retained at the desired position and orientation.

In step 906 of FIG. 9, hand tools and their related accessories/attachments are inserted into selected holes 310 to be retained in the tool tray 100. As discussed herein, a variety of hand tools and their related accessories/attachments may be retained in the tool tray 100 in a variety of holes and slots 310 in the flanges 402, 404 of the tool tray 100.

The above described components of the first and second clamp portions 700, 800 that make up a clamp fixture 300 may be manufactured from a variety of different materials. In the illustrated embodiment, the engagement legs 702, 802, clamp legs 704, 804, flanges 402, 404, and upright walls 708, 808 are formed from elongate steel square tube and/or steel sheet. Without implying any limitations, example materials include metals such as steel and aluminum, and plastics. Such materials may also be used in combinations (a clamp fixture 300 comprising a variety of materials). Various portions of the material may also have powder coated surfaces. It is also understood that while square cross-section tubular members and flanges 402, 404 with rounded corners for the clamp fixture 300 are illustrated, other shapes are also possible, such as round or rectangular tubular members, and flanges 402, 404 with squared corners or other corner shapes. Still further, although illustrated in connection with a rectangular shaped post or lift shaft, it should be further appreciated that alternative posts or similar mounting locations may be mounted with the clamp fixtures of the present invention, including posts, I-beams, or other forms of tubular columns.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A clamp fixture configured for affixing a tool tray to a post for supporting objects, comprising:
    first and second clamp portions, wherein each clamp portion comprises an engagement leg and a clamp leg that define an L-shaped orientation;
    wherein the engagement legs of the first and second clamp portions are configured to adjustably mate together to define a gap having an opening between the clamp legs of the first and second clamp portions opposite the engagement legs whereby the clamp legs of the first and second clamp portions are configured to engage surfaces of the post; and
    wherein the clamp legs of the first and second clamp portion are adjustably separable relative to each other via the engagement legs of the first and second clamp portions to affix the tool tray to the post, and wherein the first and second clamp portions each include a horizontally oriented flange portion and an upright wall extending upward from the flange portion to form tool tray halves, and wherein the flange portion of the first clamp portion overlaps with the flange portion of the second clamp portion and the upright wall of the first clamp portion overlaps with the upright wall of the second clamp portion to form a tool tray portion when the engagement legs of the first and second clamp portions are mated together.

2. The clamp fixture of claim 1, wherein the flange portions comprise openings for supporting and retaining hand tools and tool accessories, and wherein the openings comprises one or more of holes and slots.

3. The clamp fixture of claim 1, wherein the upright walls are positioned such that at least a portion of the flange portions of the first and second clamp portions extend beyond the tool tray portion defined by the upright walls.

4. The clamp fixture of claim 1, wherein each of the engagement legs comprises a square tube, with a square tube of a first engagement leg sliding into a square tube of a second engagement leg to adjustably mate the first and second clamp portions.

5. The clamp fixture of claim 4, wherein the engagement leg of the first clamp portion comprises a retained nut threaded to receive a bolt that passes through an opening in the engagement leg of the second clamp portion, such that the first and second clamp portions are adjustably matted to engage surfaces of the post with the clamp legs of the first and second clamp portions.

6. The clamp fixture of claim 1, wherein the clamp legs of the first and second clamp portions are angled such that distal portions of the clamp legs are closer together than proximal portions of the clamp legs.

7. The clamp fixture of claim 1, wherein distal portions of the clamp legs of the first and second clamp portions comprise grip surfaces that are at least one of textured, and non-slip surfaces for engaging with the post.

8. The clamp fixture of claim 1, wherein the flange portion of each of the first and second clamp portions extends horizontally outwardly from the respective engagement leg and clamp leg.

9. The clamp fixture of claim 8, wherein the tool tray portion is bounded by the upright walls of each of the first and second clamp portions and by the engagement leg and clamp leg of each of the first and second clamp portions when the engagement legs of the first and second clamp portions are mated together.

10. The clamp fixture of claim 9, wherein the engagement leg of the first clamp portion comprises a retained nut threaded to receive a bolt from the engagement leg of the second clamp portion to adjustably clamp the clamp legs of the first and second clamp portions to the post.

11. The clamp fixture of claim 9, wherein each of the engagement legs comprises a square tube, with a square tube of a first engagement leg sliding into a square tube of a second engagement leg to adjustably mate the first and second clamp portions.

12. A clamp fixture configured for affixing a tool tray to a post for supporting objects, comprising:
  first and second clamp portions, wherein each clamp portion comprises an engagement leg and a clamp leg that define an L-shaped orientation;
  wherein the engagement legs of the first and second clamp portions are configured to adjustably mate together to define a gap having an opening between the clamp legs of the first and second clamp portions opposite the engagement legs whereby the clamp legs of the first and second clamp portions are configured to engage surfaces of the post; and
  wherein the clamp legs of the first and second clamp portions are adjustably separable relative to each other via the engagement legs of the first and second clamp portions to affix the tool tray to the post, wherein a threaded nut is disposed in one of the engagement legs and a bolt extends from the other engagement leg to retains the mating of the engagement legs of the first and second clamp portions, and wherein the first and second clamp portions each include a horizontally oriented flange portion and an upright wall extending upward from the flange portion to form tool tray halves, and wherein the flange portion of the first clamp portion overlaps with the flange portion of the second clamp portion and the upright wall of the first clamp portion overlaps with the upright wall of the second clamp portion to form a tool tray portion when the engagement legs of the first and second clamp portions are mated together.

13. The clamp fixture of claim 12, wherein the flange portions comprise openings for supporting and retaining hand tools and tool accessories, and wherein the openings comprises one or more of holes and slots.

14. The clamp fixture of claim 12, wherein the upright walls are positioned such that at least a portion of the flange portions of the first and second clamp portions extend beyond the tool tray portion defined by the upright walls.

15. The clamp fixture of claim 12, wherein each of the engagement legs comprises a square tube, with a square tube of a first engagement leg sliding into a square tube of a second engagement leg to adjustably mate the first and second clamp portions.

16. The clamp fixture of claim 12, wherein the clamp legs of the first and second clamp portions are angled such that distal portions of the clamp legs are closer together than proximal portions of the clamp legs.

17. The clamp fixture of claim 12, wherein distal portions of the clamp legs of the first and second clamp portions comprise grip surfaces that are at least one of textured, and non-slip surfaces for engaging with the post.

18. The clamp fixture of claim 12, wherein the flange portion of each of the first and second clamp portions extends horizontally outwardly from the respective engagement leg and clamp leg.

19. The clamp fixture of claim 18, wherein the tool tray portion is bounded by the upright walls of each of the first and second clamp portions and by the engagement leg and clamp leg of each of the first and second clamp portions when the engagement legs of the first and second clamp portions are mated together.

* * * * *